(12) United States Patent
Waalkens et al.

(10) Patent No.: US 9,975,088 B2
(45) Date of Patent: May 22, 2018

(54) METHOD FOR THE PURIFICATION OF GASES CONTAINING VOLATILE ORGANIC COMPOUNDS

(71) Applicants: UNIVERSITAT DE VALENCIA, Valencia (ES); DSF BV, Dwingeloo (NL)

(72) Inventors: Albert Waalkens, Dwingeloo (NL); Maria Carmen Gabaldón Garcia, Valencia (ES); Josep Manuel Peñarrocha Oltra, Valencia (ES); Francisco Javier Álvarez Hornos, Valencia (ES)

(73) Assignees: UNIVERSITAT DE VALENCIA, Valencia (ES); DSF BV, Dwingeloo (NL)

( * ) Notice: Subject to any disclaimer, the term of this patent is extended or adjusted under 35 U.S.C. 154(b) by 0 days. days.

(21) Appl. No.: 15/113,830

(22) PCT Filed: Jan. 23, 2015

(86) PCT No.: PCT/IB2015/000059
§ 371 (c)(1),
(2) Date: Jul. 24, 2016

(87) PCT Pub. No.: WO2015/114436
PCT Pub. Date: Aug. 6, 2015

(65) Prior Publication Data
US 2016/0332115 A1 Nov. 17, 2016

(30) Foreign Application Priority Data

Feb. 3, 2014 (ES) .................................. 201430125

(51) Int. Cl.
*B01D 53/72* (2006.01)
*C02F 1/20* (2006.01)
(Continued)

(52) U.S. Cl.
CPC ......... *B01D 53/72* (2013.01); *B01D 53/1425* (2013.01); *B01D 53/1487* (2013.01);
(Continued)

(58) Field of Classification Search
CPC ................ B01D 53/72; B01D 53/1425; B01D 53/1487; B01D 53/84; C02F 1/20;
(Continued)

(56) References Cited

U.S. PATENT DOCUMENTS 4,723,968 A 2/1988 Schippert et al.
4,986,837 A * 1/1991 Shibata .............. B01D 19/0031
96/6

(Continued)

FOREIGN PATENT DOCUMENTS

EP 2463240 A1 6/2012
EP 2522634 A1 11/2012
(Continued)

OTHER PUBLICATIONS

Adalberto Noyola et al, "Treatment of Biogas Produced in Anaerobic Reactors for Domestic Wastewater: Odor Control and Energy Resource Recovery", Reviews in Environmental Science & Biotechnology, Kluwer Academic Publishers, Do, vol. 5 No. 1, Feb. 1, 2006, pp. 93-114.

*Primary Examiner* — Daniel C McCracken
(74) *Attorney, Agent, or Firm* — Robert J. Hess; Hess Patent Law Firm (57) ABSTRACT

The present invention relates to a method for purifying a gas comprising: a) feeding the gas (1) to an absorber (5) and bringing into contact said gas (1) with a stream (3) (or alternatively (3')) to obtain a liquid (4) and a purified gas stream (2); b) feeding the liquid (4) to a conditioning tank (9) and adding a mineral nutrient medium (6) and a suitable amount of base (7) to the liquid (4) to obtain a liquid effluent
(Continued)

(8); c) feeding the liquid effluent (8) to an anaerobic bioreactor (14) to obtain a biomethane stream (11) and a liquid stream (12); d) feeding the liquid stream (12) to a degasser (20) to obtain a gas stream (18) and a stream (3'); and e) recirculating the stream (3') by feeding it to the absorber (5).

15 Claims, 4 Drawing Sheets

(51) Int. Cl.

| | |
|---|---|
| C02F 9/00 | (2006.01) |
| C02F 1/66 | (2006.01) |
| C02F 3/06 | (2006.01) |
| C02F 3/28 | (2006.01) |
| B01D 53/14 | (2006.01) |
| C02F 1/28 | (2006.01) |
| B01D 53/84 | (2006.01) |
| C02F 103/18 | (2006.01) |

(52) U.S. Cl.
CPC ......... *B01D 53/84* (2013.01); *C02F 1/20* (2013.01); *C02F 1/28* (2013.01); *C02F 1/66* (2013.01); *C02F 3/06* (2013.01); *C02F 3/28* (2013.01); *C02F 9/00* (2013.01); *B01D 2251/304* (2013.01); *B01D 2251/306* (2013.01); *B01D 2251/404* (2013.01); *B01D 2251/604* (2013.01); *B01D 2251/606* (2013.01); *B01D 2256/245* (2013.01); *B01D 2257/704* (2013.01); *B01D 2257/708* (2013.01); *B01D 2257/80* (2013.01); *C02F 2103/18* (2013.01); *C02F 2209/07* (2013.01); *Y02C 20/20* (2013.01); *Y02E 50/343* (2013.01); *Y02W 10/12* (2015.05); *Y02W 10/15* (2015.05)

(58) Field of Classification Search
CPC ...... C02F 1/28; C02F 1/66; C02F 3/06; C02F 3/28; C02F 9/00; C02F 2103/18
See application file for complete search history.

(56) References Cited

U.S. PATENT DOCUMENTS

| | | |
|---|---|---|
| 5,157,205 A | 10/1992 | Welton |
| 5,637,498 A | 6/1997 | Ottengraph et al. |
| 5,681,470 A | 10/1997 | Safi |
| 6,280,696 B1 | 8/2001 | Hsu et al. |
| 2007/0122900 A1 | 5/2007 | Lisberger |

FOREIGN PATENT DOCUMENTS

| | | |
|---|---|---|
| FR | 2328501 | 5/1977 |
| WO | WO 2015114436 A1 | 8/2015 |

* cited by examiner

METHOD FOR THE PURIFICATION OF GASES CONTAINING VOLATILE ORGANIC COMPOUNDS

The present invention relates to gas purification. The present invention particularly relates to a gas purification method by means of treating a residual gas stream containing volatile organic compounds originated from the industrial use of solvents.

STATE OF THE ART

It is known in the industrial sector that air emissions of volatile organic compounds derived from the use of industrial solvents are limited by law due to their adverse environmental impact. Therefore, the removal of volatile organic compounds from residual gas streams originated from said industrial processes using organic solvents is necessary as a step prior to atmospheric emission thereof. Many methods and techniques for removing volatile organic compounds are known today.

Biological processes are an alternative to conventional physical and chemical processes, such as activated carbon adsorption and regenerative thermal oxidation techniques, due to their environmental and economic advantages, among others.

There are different types of aerobic biological processes such as, for example, fixed-bed systems and systems based on scrubbing the gas and then biologically degrading the contaminants transferred to the scrubbing liquid by means of suspended-growth cultures. All these systems are based on complete oxidation of volatile organic compounds and do not allow reuse thereof.

Fixed-bed systems including, among others, biofilters and trickling biofilters, have the drawback of using excessive residence times to attain the necessary effectiveness, with installations that require a large footprint.

In addition, processes based on gas wet-scrubbing as the only gas purification step may not be effective enough so as to comply with the legal requirements in force, depending on the type of volatile organic compound present in the gas to be purified.

Particularly, patent documents NL7611697A (an equivalent patent of document FR2328501), U.S. Pat. No. 5,637,498A, U.S. Pat. No. 4,723,968A and US2007/0122900A1 describe gas wet-scrubbing processes followed by suspended-growth aerobic biological processes. The specific main drawbacks of aerobic bioscrubbing systems are high power consumption and high production of biomass, a waste associated with aerobic degradation of organic contaminants.

U.S. Pat. No. 5,681,470A describes a method for the extraction of lightweight organic solvents from a gaseous effluent by means of wet scrubbing the gaseous medium and biomethanization of the liquid loaded with the solvents. After passing through the anaerobic reactor, the liquid stream is recirculated to the scrubber with the subsequent fugitive emission of the methane dissolved therein. Furthermore, the produced biogas contains high proportions of carbon dioxide, which prevents the direct use thereof, for example, as a replacement for natural gas, or injection thereof into the gas grid. Particularly, the pH of streams entering and exiting the anaerobic reactor of the extraction method described in U.S. Pat. No. 5,681,470A are 6.0 and 6.8, respectively, which allows obtaining a biogas stream wherein the percentage of carbon dioxide is 18.2%.

Therefore, despite advances made in removing volatile organic compounds from residual gas streams derived from the use of industrial solvents, there is still a need to find an effective gas purification method to comply with the legal requirements in force, with a low production and maintenance cost, and which furthermore allows reusing the solvents used by means of converting them into methane, reducing the environmental impact and carbon footprint.

DESCRIPTION OF THE INVENTION

The authors of the present invention have developed an effective gas purification method for treatment of a residual gas stream containing volatile organic compounds to obtain an essentially methane-free purified gas stream (2) (or alternatively (2') or (2")) with a reduced volatile organic compound content such that it can be emitted directly into the atmosphere, solving the problems of reducing the environmental impact, reducing the carbon footprint and complying with the emission limits mentioned above in the state of the art.

Figure 1:
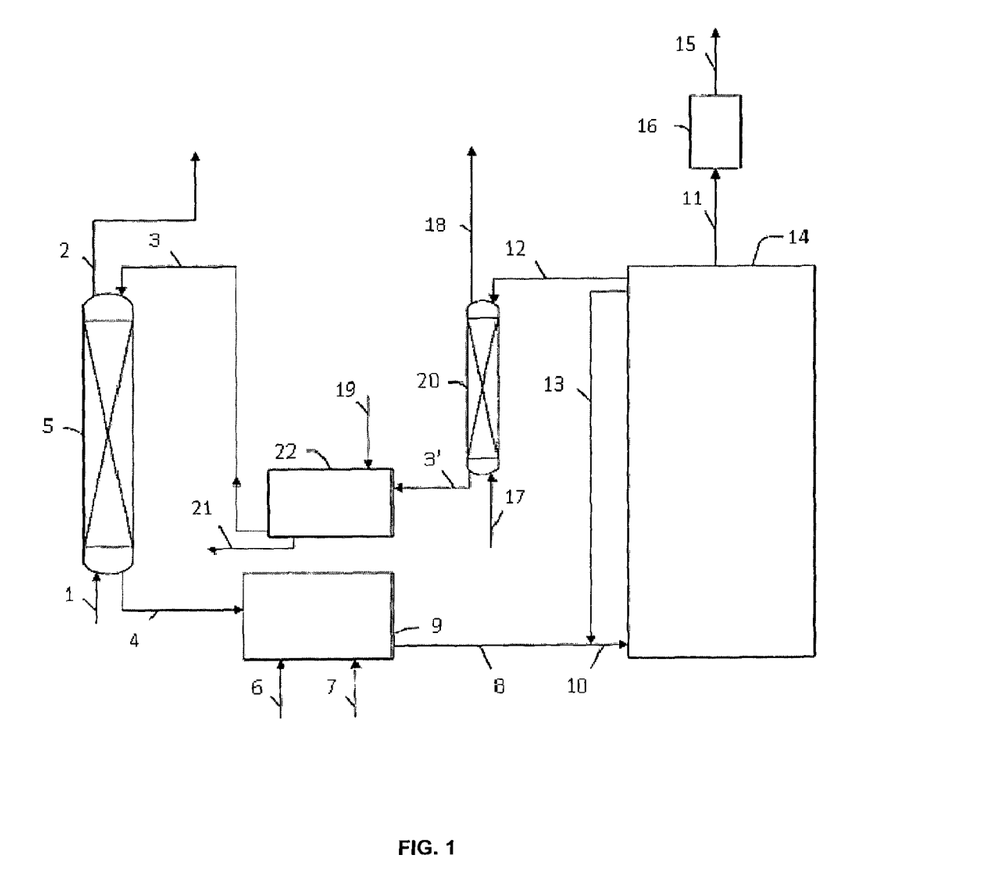
FIG. 1 is a block diagram depicting an embodiment of the invention with the steps of the method of the invention.

The present invention therefore provides a method for purifying a gas containing volatile organic compounds which comprises: a) feeding the gas (1) to an absorber (5) and bringing into contact said gas (1) with an aqueous stream (3) the pH of which is comprised between 8.0 and 9.5 to obtain a liquid (4) comprising volatile organic compounds, and a purified gas stream (2); b) feeding the liquid (4) comprising volatile organic compounds obtained in step a) to a conditioning tank (9) and adding a mineral nutrient medium (6) and a suitable amount of a base (7) to the liquid (4) to obtain a liquid effluent (8) the pH of which is comprised between 7.5 and 10 and the total alkalinity of which is comprised between 750 and 5,000 mg $CaCO_3$/L; c) feeding the liquid effluent (8) obtained in step b) to an anaerobic bioreactor (14) to obtain a biomethane stream (11) wherein the percentage of carbon dioxide is equal to or less than 15% by volume with respect to the volume of the stream (11) expressed as a dry base, and an output liquid stream (12) exiting the bioreactor the pH of which is comprised between 7.0 and 8.5; d) feeding the output liquid stream (12) exiting the bioreactor obtained in step c) to a degasser (20) to obtain a gas stream (18) comprising methane, and an aqueous stream (3'); and e) recirculating the aqueous stream (3') by feeding it to the absorber (5), wherein: total alkalinity of each of the streams of steps a), c), d) and e) and of each of units (5), (9), (14) and (20) (i.e. of absorber (5), conditioning tank (9), anaerobic bioreactor (14) and degasser (20)) is equal to total alkalinity of the liquid effluent (8) of step b) ±20% of the total value (see FIG. 1).

Total alkalinity and pH conditions of the system allow obtaining a purified gas stream (2) (or alternatively (2') or (2")) and a biomethane stream (11) wherein the percentage of carbon dioxide is equal to or less than 15% by volume with respect to the volume of the biomethane stream (11) expressed as a dry base. The purified gas stream (2) (or alternatively (2') or (2")) has a volatile organic compound content less than the content of the gas stream (1).

The term "biomethane stream" (11) refers to a gas stream comprising methane and carbon dioxide which is obtained from the anaerobic decomposition of organic solvents, and the carbon dioxide content of which is such that it allows direct usage thereof, for example, as a replacement for natural gas in those combustion processes carried out in the industrial plant that produces the residual gas to be purified by the invention or by means of direct injection into the gas grid. The biomethane stream (11) of the present invention has a percentage of carbon dioxide equal to or less than 15% by volume with respect to the volume of the biomethane stream (11) expressed as a dry base; preferably equal to or less than 9% by volume with respect to the volume of the biomethane stream (11) expressed as a dry base. The term "dry base" refers to the volume of biomethane stream (11) after dehumidification, i.e., the stream (11) in the absence of water.

The term "purified gas stream (2)" or "purified gas stream (2')" or "purified gas stream (2")" or "purified gas (2)" refers to a gas stream the volatile organic compound content of which is less than the volatile organic compound content of the gas stream (1).

The method of the invention allows the methane dissolved in the output liquid stream (12) exiting the anaerobic reactor to be separated in the degasser (20) as a prior step to recirculation of the aqueous stream (3') to the absorber (5). The degasser (20) allows operating in a closed circuit without methane emissions with the purified gas (2) (or alternatively (2'), or (2")) and obtaining a gas stream (18) comprising methane. The transfer of the methane dissolved in the liquid stream (12) and the concentration thereof in the gas stream (18) allows preventing diffused and uncontrolled atmospheric methane emission with the purified gas (2) (or alternatively (2'), or (2")). Furthermore, it also facilitates control or energy usage of the gas stream (18) as it is a concentrated methane stream. The method of the invention allows obtaining a purified gas (2) (or alternatively (2') or (2")), the methane content of which is comprised between 1 ppmv and 20 ppmv, preferably between 1 ppmv and 8 ppmv.

The combination of pH and alkalinity values in process units (9), (14), and (20) leads to the cleaning, i.e. the dissolving, of the carbon dioxide generated in the anaerobic reactor (14) in the reactor itself, which allows obtaining the in-situ biomethane stream (11) in the reactor (14). The carbon dioxide originated from anaerobic decomposition in the bioreactor (14) dissolves into the output liquid stream (12) exiting the bioreactor and is then removed from the liquid recirculated into the degasser (20), reaching basic pH values, without causing bicarbonate alkalinity loss in the closed liquid circuit. That is advantageous because it allows adjusting the consumption of base (7) to the replenishment by purge (21) and to the addition of the aqueous stream (19).

Suitable degassers (20) for the present invention include any degassing configuration known in the state of the art. In one embodiment of the invention, the degasser (20) is an air stripper and step d) comprises bringing into contact said liquid stream (12) with an air stream (17); step d) is preferably carried out by bringing into contact said liquid stream (12) with an air stream (17), more preferably a countercurrent air stream, to obtain a gas stream (18) comprising methane, and an aqueous stream (3'). In another embodiment of the invention, when the degasser is an air stripper, then the flow rate of the air stream (17) in the degasser (20) is at least 5 times less than the flow rate of the gas (1), preferably, the flow rate of the air stream (17) is at least 10 times less than the flow rate of the gas (1). That is advantageous because it facilitates subsequent control of the gas stream (18), for example, by means of its energy use or destroying it.

The method of the invention comprises recirculating the aqueous stream (3') obtained in step d) by feeding it to the absorber (5). This recirculation can be carried out directly, or alternatively, the aqueous stream (3') obtained in step d) can be stored in a buffer tank (22) to obtain the stream (3) and recirculate said stream (3) in the absorber (5).

When recirculation of the aqueous stream (3') is carried out by feeding it directly to the absorber (5), the stream (3) and the stream (3') is the same stream.

When recirculation is carried out by means of storage in a buffer tank (22), said buffer tank (22) allows buffering fluctuations associated with the gas (1) and thereby allows assuring continuous operation of the bioreactor (14) in those situations in which the gas (1) is not emitted 24 hours a day.

Suitable absorbers for the present invention can be any type of conventional gas absorber such that it provides sufficient contact between the gas stream (1) and the aqueous stream (3) (or alternatively (3')) in order to promote the transfer of volatile organic compounds to the aqueous stream (3) (or alternatively (3')).

In one embodiment of the invention, the method can further comprise purge (21) and the addition of an aqueous stream (19) after step d). This allows renewing the aqueous stream (3') and assuring continuous operation of the system. In a more particular embodiment, the daily purge volume with respect to total liquid volume of the system is comprised between 1% and 10% volume/volume, preferably between 2% and 7%, more preferably between 3% and 4% volume/volume. In a particular embodiment, the water of the aqueous stream (19) is tap water.

In one embodiment of the invention, the pH of the liquid effluent (8) of step b) is comprised between 7.5 and 8.5.

In another embodiment of the invention, the pH of the liquid stream (12) of step c) is comprised between 7.0 and 7.8.

In the method of the invention, the total alkalinity value remains essentially constant with a maximum variation between the different points of ±20%. Therefore, total alkalinity of each of the streams of steps a), c), d) and e) and of each of units (5), (9), (14) and (20) (i.e. of absorber (5), conditioning tank (9), anaerobic bioreactor (14) and degasser (20)) is equal to total alkalinity of the liquid effluent (8) of step b) ±20% of the total value, preferably ±15% of the total value, more preferably ±10% of the total value. In another embodiment of the invention, total alkalinity of the liquid effluent (8) of step b) is comprised between 1,000 and 3,000 mg $CaCO_3$/L.

As mentioned previously, total alkalinity of the liquid effluent (8) of step b) is comprised between 750 and 5,000 mg $CaCO_3$/L, and the pH of the output liquid stream (12) exiting the bioreactor is comprised between 7.0 and 8.5. In one embodiment of the invention, total alkalinity of the liquid effluent (8) of step b) is comprised between 1,000 and 3,000 mg $CaCO_3$/L, and the pH of the output liquid stream (12) exiting the bioreactor is comprised between 7.0 and 7.8.

The terms "volatile organic compound" or "VOC" have the same meaning and are used interchangeably. These terms refer to any organic compound having vapor pressure equal to or greater than 0.01 kPa at 293.15 K, or having equivalent volatility under particular conditions of use. The terms can also be defined as any organic compound having an initial boiling point less than or equal to 250° C. at a standard pressure of 101.3 kPa.

The volatile organic compounds of the gas (1) can comprise water-soluble or partially water-soluble volatile organic compounds with an alcohol-, ester-, ketone-, aldehyde- or carboxylic acid-type chemical structure with a Henry's law constant >2.5 mol/(Kg.bar) at 298.15 K. In one embodiment of the invention, the mass percentage of volatile organic compounds with a Henry's law constant >2.5 mol/(Kg.bar) at 298.15 K in the gas (1) is comprised between 80% and 100% with respect to total volatile organic compounds.

The Henry's law constant ($K_H$) describes gas solubility in water. The Henry's law constant value can be calculated by means of the following equation:

$$k_H = ca/Pg$$

wherein ca is the concentration of the species in water expressed in mol/Kg, Pg is the partial pressure of the species in the gas phase expressed in bar. The $k_H$ value relates to a temperature of 298.15 K. An exhaustive list of Henry's law constant values for substances can be found in "R. Sander, Henry's Law Constants in NIST Chemistry Webbook. NIST Standard Reference Database Number 69, in: P. J. Lisntrom, W. G. Mallard (Eds.), National Institute of Standards and Technology, Gaithersburg Md. 208999, USA, 2005, http://webbook.nist.gov/ (obtained on Oct. 23, 2013)".

In one embodiment of the invention, the method further comprises feeding the gas stream (1), or alternatively the purified gas stream (2), to an alkaline scrubber (27) wherein the transfer of the volatile organic compounds, including those with an ester-type chemical structure and a Henry's law constant >2.5 mol/(Kg.bar) at 298.15 K, is performed (steps f and f'), The output liquid stream exiting the alkaline scrubber is subsequently brought into contact with a suitable amount of base in a hydrolysis tank (25) in which alkaline hydrolysis of dissolved esters is completed (steps g and g'). A first liquid stream comprising the hydrolysis products is extracted from the hydrolysis tank (25) and transferred to the conditioning tank (9), and a second aqueous stream is extracted from the hydrolysis tank (25) and recirculated to the alkaline scrubber (27) (steps h and h'). This method is advantageous because it allows reducing the content of volatile organic compounds with an ester-type chemical structure and a Henry's law constant >2.5 mol/(Kg.bar) at 298.15 K in the purified stream (2) (or alternatively (2') or (2")). Specifically, this method is particularly advantageous when the mass percentage of volatile organic compounds with an ester-type chemical structure and a Henry's law constant >2.5 mol/(Kg.bar) at 298.15 K in the gas (1) is equal to or greater than 15%, or equal to or greater than 20%, with respect to total volatile organic compounds.

Figure 2:
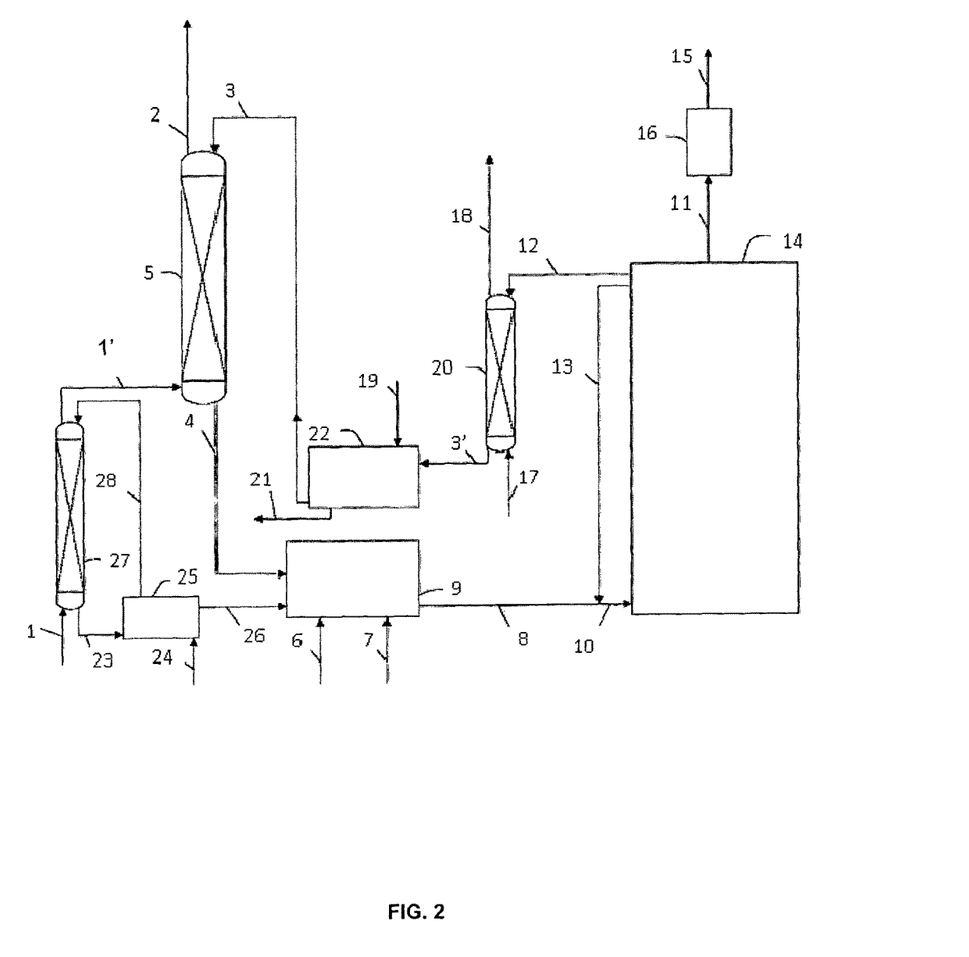
FIG. 2 is a block diagram depicting another embodiment of the invention with the steps of the method of the invention.

In one embodiment of the invention, the method further comprises carrying out additional steps f), g) and h) before step a), wherein said steps comprise: f) feeding the gas (1) to an alkaline scrubber (27) and bringing into contact said gas (1) with an aqueous stream (28) at a pH comprised between 11 and 13 to obtain a liquid stream (23) and the gas stream (1'); g) feeding the liquid stream (23) obtained in step f) to a hydrolysis tank (25) and adding a suitable amount of base (24) to the liquid stream (23) to obtain a liquid effluent (26) and the aqueous stream (28); and h) feeding the liquid effluent (26) obtained in step g) to the conditioning tank (9) and recirculating the aqueous stream (28) by feeding it to the alkaline scrubber (27) (see FIG. 2).

Figure 3:
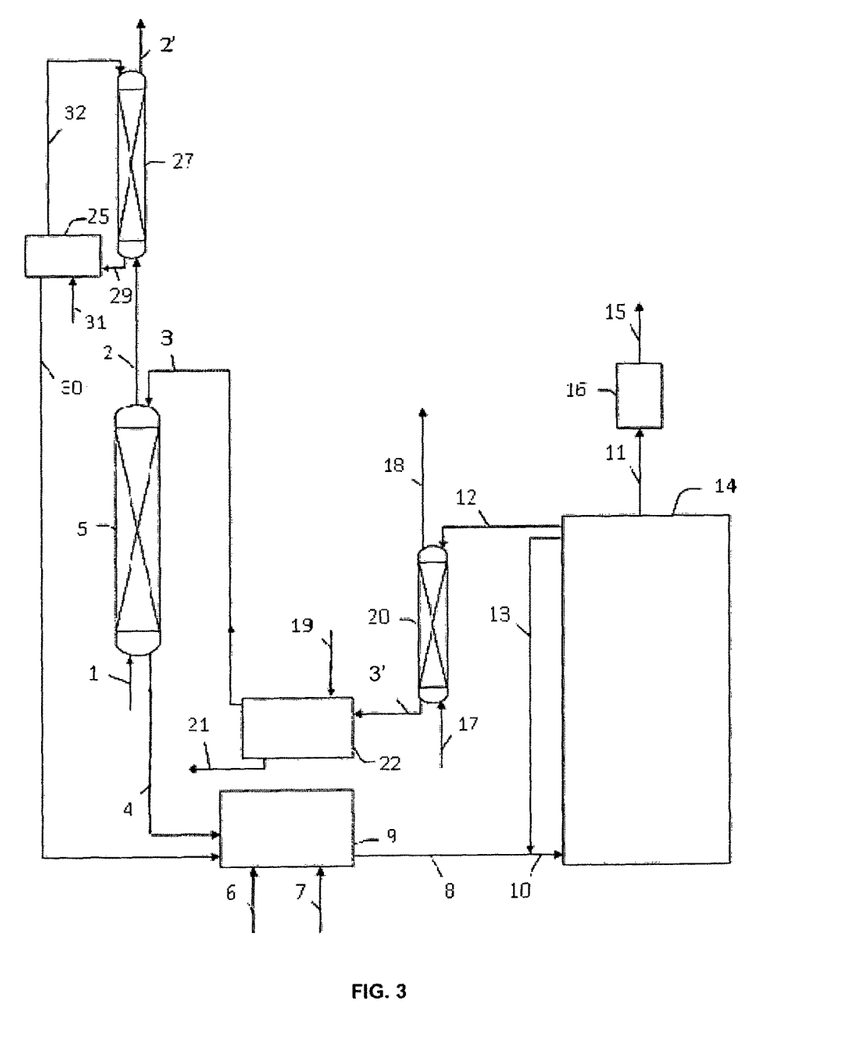
FIG. 3 is a block diagram depicting another embodiment of the invention with the steps of the method of the invention.

In another alternative embodiment of the invention, the method further comprises carrying out steps f'), g'), and h') after step a), wherein said steps comprise: f') feeding the purified gas stream (2) obtained in step a) to an alkaline scrubber (27) and bringing into contact said purified gas stream (2) with an aqueous stream (32) at a pH comprised between 11 and 13 to obtain a liquid stream (29) and the purified gas stream (2'); g') feeding the liquid stream (29) obtained in step f') to a hydrolysis tank (25) and adding a suitable amount of base (31) to the liquid stream (29) to obtain a liquid effluent (30) and the aqueous stream (32); and h') feeding the liquid effluent (30) obtained in step g') to the conditioning tank (9) and recirculating the aqueous stream (32) by feeding it to the alkaline scrubber (27) (see FIG. 3).

Figure 4:
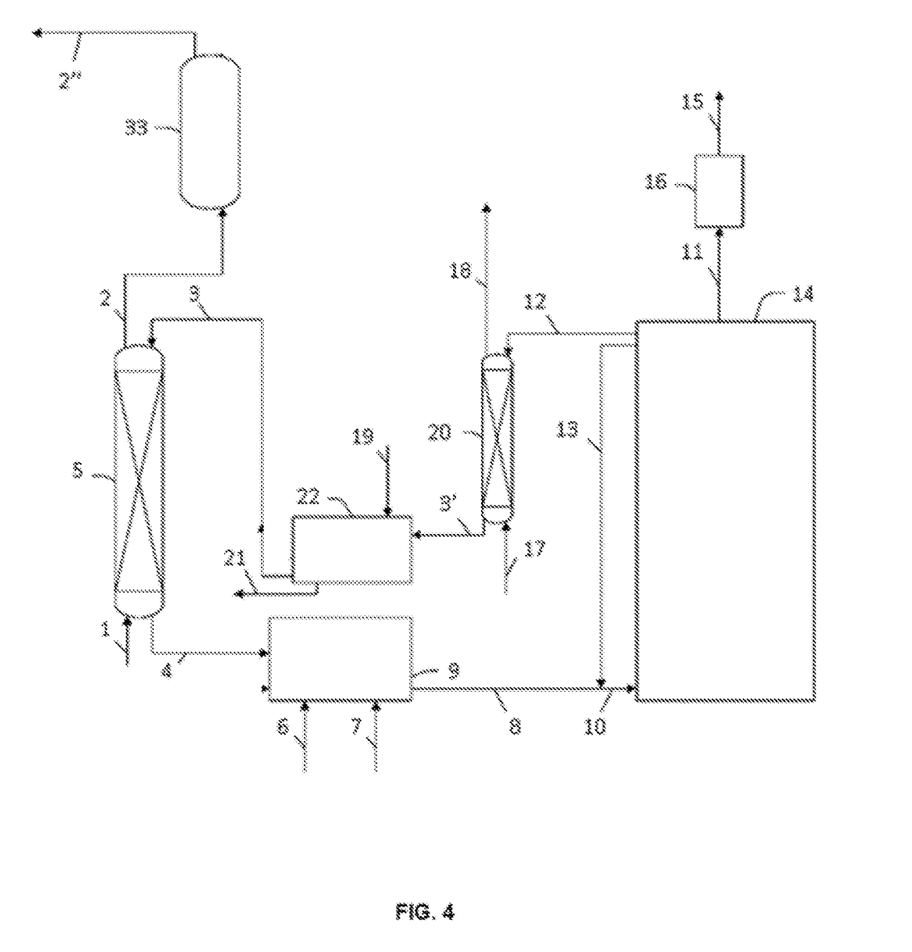
FIG. 4 is a block diagram depicting another embodiment of the invention with the steps of the method of the invention.

In another embodiment of the invention, the method further comprises an additional step i) after step a), wherein said step comprises feeding the purified gas stream (2) obtained in step a) to a fixed-bed aerobic bioreactor (33) to obtain the purified gas stream (2"). In a preferred embodiment, the fixed-bed aerobic bioreactor (33) is selected from the group consisting of a biofilter and a trickling biofilter. This allows further reducing the amount of volatile organic compounds in the purified gas stream (2) prior to the atmospheric emission thereof (see FIG. 4).

In one embodiment of the invention, step a) is carried out by feeding the gas (1) to the absorber (5) and bringing into contact said gas with the aqueous stream (3) (or alternatively (3')) in a countercurrent mode.

In step b) of the method of the invention, a mineral nutrient medium (6) is added in the conditioning tank (9) according to the stoichiometric needs of the anaerobic process taking place in the reactor (14). The nutrient solutions are prepared from commercial chemical compounds containing, among others, macronutrients such as N, P and S, for example, and micronutrients such as Fe, and Zn. The dosing thereof is widely described in the state of the art (see Metcalf and Eddy. "Anaerobic Suspended and Attached Growth Biological Treatment Processes", Chapter 10, McGraw-Hill, $4^{th}$ edition, New York, 2004, pp. 990-991). The person skilled in the art can adjust the specific amounts of the components of the mineral nutrient medium according to the specific conditions of the method. In one embodiment of the invention, the mineral nutrient medium (6) comprises N, P, K, S, Ca, Mg, Fe, Co, Ni, Mo, Zn, Mn, Cu, Al and B. The nutrient solutions also comprise yeast extract as a source of vitamins and enzymes.

In one embodiment of the invention, base (7) of step b), base (24) of step g) and base (31) of step g') are independently selected from the group consisting of alkaline or alkaline earth metal carbonates, such as sodium carbonate or potassium carbonate, alkaline or alkaline earth metal hydroxides, such as sodium hydroxide, potassium hydroxide or calcium hydroxide, and alkaline or alkaline earth metal hydrogen carbonates, such as sodium hydrogen carbonate or potassium hydrogen carbonate. In a preferred embodiment, base (7) of step b), base (24) of step g) and base (31) of step g') are independently selected from sodium hydroxide and sodium carbonate.

In one embodiment of the invention, the addition of base (7) is carried out until the pH of the bioreactor (14) is comprised between 7.0 and 10, preferably between 7.0 and 8.5, more preferably between 7.5 and 8.5.

The organic substances of the liquid stream (8) through the feed line (10) of the anaerobic reactor originated from the dissolving of the volatile organic compounds are decomposed by the action of anaerobic bacteria in the reactor (14), fundamentally being transformed into methane and carbon dioxide. Suitable anaerobic reactors for the present invention can be any anaerobic reactor described in the state of the art, such as upflow anaerobic reactors, for example. It is known that anaerobic bacteria naturally form macroscopic granules under certain flow conditions and organic matter concentration, which allows using simple devices for the retention thereof inside the reactor. The reactor (14) has therein a gas-liquid-solid separator. Suitable gas-liquid-solid separators for the present invention can be any separator described in the state of the art.

In one embodiment of the invention, the bioreactor (14) further comprises a solid separator for separating solids by settling which is installed at the reactor outlet and allows improving the retention of anaerobic bacteria inside the bioreactor.

In one embodiment of the invention, step c) is carried out at a temperature comprised between 14° C. and 34° C., preferably between 19° C. and 31° C.

In one embodiment of the invention, the method of the invention further comprises an additional step j) after step c), wherein said step comprises feeding the biomethane stream (11) obtained in step c) to a dehumidifier (16) to obtain a dry biomethane stream (15). The biomethane stream (11) is usually saturated with water. Before its energy use, said biomethane stream (11) is dried in a dehumidifier (16) in the presence of one or more drying agents. Suitable drying agents for the present invention can be any drying agent commonly used in the state of the art, such as zeolites, silica gel or aluminum oxide, for example.

In a particular embodiment, step j) of dehumidification is carried out in a dehumidifier (16) comprising a two-column system, wherein the wet biomethane stream (11) goes through one of the two columns, whereas the other column is regenerated. The dry biomethane stream (15) comprising methane and carbon dioxide has the advantage that it can be used directly as a replacement for natural gas in the industrial plant that produces the residual gas to be purified by the invention.

In one embodiment, the method of the invention further comprises an additional step after step c) which comprises recirculating a fraction of the output liquid stream (12) exiting the bioreactor through a recirculation line (13). Therefore, in one embodiment the method of the invention further comprises an additional step after step c), wherein said step comprises: k) recirculating from 1 to 95% of the output liquid stream (12) to the liquid effluent (8) before the bioreactor (14), or alternatively I) recirculating from 1 to 95% of the output liquid stream (12) to the conditioning tank (9). Therefore, the fraction of the output liquid stream (12) exiting the bioreactor can be recirculated through the recirculation line (13), wherein said line (13) starts directly from the bioreactor (14), or alternatively said line (13) starts from the circulation line going from the bioreactor (14) to the degasser (20).

In a particular embodiment, the method of the invention further comprises suitable measuring, regulating and control elements, as well as ancillary equipment required for carrying out said method, such as pumps, fans, valves and pipes.

The invention also relates to a device for carrying out the method for purifying a gas according to any of the particular embodiments herein indicated and the possible combinations thereof comprising an absorber (5), a conditioning tank (9), an anaerobic bioreactor (14) and a degasser (20).

Throughout the description and claims the word "comprises" and variants thereof do not intend to exclude other technical features, supplements, components or steps. Furthermore, the word "comprises" includes the case "consists of". For persons skilled in the art, other objects, advantages and features of the invention will be understood in part from the description and in part from the practice of the invention. The following examples and drawings are provided by way of illustration and are not meant to limit the present invention. Reference numbers related to the drawings and placed in parentheses in the claims only aim to increase understanding of the claims and must not be interpreted as limiting the scope of protection of the claims. Furthermore, the present invention covers all possible combinations of particular and preferred embodiments herein indicated.

EXAMPLES

A gas containing a total volatile organic compound concentration of 3870 mg/m$^3$ with a mass composition (% by weight) of about 56% ethanol, 19% ethyl acetate, 13% ethoxy-2-propanol, 5% n-propanol, 5% n-propyl acetate, 1% methoxy-2-propanol, 1% isopropyl acetate is purified in an installation such as that shown in FIG. 1.

The purification conditions and gas purification results in the different streams of the method of the invention are provided in detail below in Tables 1 and 2.

TABLE 1

| | Experimental conditions | |
|---|---|---|
| 1 | Flow rate (m$^3$/h) | |
| | 00:00-6:30 h | — |
| | 6:30-22:30 h | 400 |
| | 22:30-24:00 h | — |
| | Total concentration (mg/m$^3$) | 3870 |
| 2 | CH$_4$ (ppmv) | 4 |
| 3 | Flow rate (m$^3$/h) | |
| | 00:00-6:30 h | — |
| | 6:30-22:30 h | 3 |
| | 22:30-24:00 h | — |
| | pH | 8.5 |
| 8 | pH | 8.7 |
| | Alkalinity (g CaCO$_3$/m$^3$) | 1500 |
| 12 | Temperature (° C.) | 22.1 |
| | pH | 7.5 |
| | Alkalinity (g CaCO$_3$/m$^3$) | 1650 |
| | CH$_4$ (g/m$^3$) | 32 |
| 13 | Flow rate (m$^3$/h) | |
| | 00:00-6:30 h | 3 |
| | 6:30-22:30 h | — |
| | 22:30-24:00 h | 3 |
| 15 | Flow rate (m$^3$/d) | 14.2 |
| | CH$_4$ (% v/v) | 94.6 |
| | CO$_2$ (% v/v) | 5.4 |
| | H$_2$S (ppmv) | 6.5 |
| 3' | pH | 8.4 |
| | CH$_4$ (g/m$^3$) | 0.35 |
| 21 | Flow rate (m$^3$/day) | 0.5 |
| | Chemical Oxygen Demand (g/m$^3$) | 662 |
| 9 | Volume (m$^3$) | 4 |
| 14 | Volume (m$^3$) | 8.7 |
| 22 | Volume (m$^3$) | 1.5 |

TABLE 2

| | Purification results | | |
|---|---|---|---|
| | Content | | |
| | 1 | | 2 |
| VOC | mg/m³ | % | mg/m³ |
| ethanol | 2168 | 56 | 5.0 |
| ethyl acetate | 735 | 19 | 57.5 |
| ethoxy-2-propanol | 503 | 13 | 6.0 |
| n-propanol | 194 | 5 | 0.8 |
| n-propyl acetate | 194 | 5 | 13.5 |
| methoxy-2-propanol | 38 | 1 | 5.2 |
| isopropyl acetate | 38 | 1 | 2.7 |

It can be inferred from the results of Tables 1-2 that the method of the invention allows effectively purifying VOCs of residual gases of the gas (1) and obtaining in-situ in the bioreactor (14) a biomethane stream (11) wherein the percentage of carbon dioxide is less than 15% by volume (in the case of this example, 5.4% v/v in stream (15)) which allows using it directly as fuel. Furthermore, this method substantially prevents atmospheric methane emissions, as seen in the methane content in the purified gas stream (2) (in the case of the example, 4 ppmv).

The activities leading to this invention have received funding from the European Union Seventh Framework Programme (PM7/2007-2013) under grant agreement no°284949.

The invention claimed is:

1. A method for purifying a gas containing volatile organic compounds which comprises:
    a) feeding the gas (1) to an absorber (5) and bringing into contact said gas (1) with an aqueous stream (3) the pH of which is comprised between 8.0 and 9.5 to obtain a liquid (4) comprising volatile organic compounds, and a purified gas stream (2);
    b) feeding the liquid (4) comprising volatile organic compounds obtained in step a) to a conditioning tank (9) and adding a mineral nutrient medium (6) and a suitable amount of base (7) to the liquid (4) to obtain a liquid effluent (8) the pH of which is comprised between 7.5 and 10 and the total alkalinity of which is comprised between 750 and 5,000 mg $CaCO_3$/L;
    c) feeding the liquid effluent (8) obtained in step b) to an anaerobic bioreactor (14) to obtain a biomethane stream (11) wherein the percentage of carbon dioxide is equal to or less than 15% by volume with respect to the volume of the stream (11) expressed as a dry base, and an output liquid stream (12) exiting the bioreactor the pH of which is comprised between 7.0 and 8.5;
    d) feeding the output liquid stream (12) exiting the bioreactor obtained in step c) to a degasser (20) to obtain a gas stream (18) comprising methane, and an aqueous stream (3'); and
    e) recirculating the aqueous stream (3') by feeding it to the absorber (5);
    wherein:
    total alkalinity of each of the streams of steps a), c), d) and e) and of each of said absorber (5), conditioning tank (9), anaerobic bioreactor (14) and degasser (20) is equal to total alkalinity of the liquid effluent (8) of step b) ±20% of the total value.

2. The method according to claim 1, further comprising purge (21) and the addition of an aqueous stream (19) after step d), wherein the daily purge volume is comprised between 1 and 10% by volume with respect to total liquid volume of the system.

3. The method according to claim 1, which further comprises feeding the aqueous stream (3') obtained in step d) to a buffer tank (22) to obtain the stream (3) and recirculating said stream (3) by feeding it to the absorber (5).

4. The method according to claim 1, wherein the method further comprises carrying out additional steps f), g) and h) before step a), wherein said steps comprise:
    f) feeding the gas (1) to an alkaline scrubber (27) and bringing into contact said gas (1) with an aqueous stream (28) at a pH comprised between 11 and 13 to obtain a liquid stream (23) and the gas stream (1');
    g) feeding the liquid stream (23) obtained in step f) to a hydrolysis tank (25) and adding a suitable amount of base (24) to the stream (23) to obtain a liquid effluent (26) and the aqueous stream (28); and
    h) feeding the liquid effluent (26) obtained in step g) to the conditioning tank (9) and recirculating the aqueous stream (28) by feeding it to the alkaline scrubber (27).

5. The method according to claim 1, wherein the method further comprises carrying out steps f'), g'), and h') after step a), wherein said steps comprise:
    f') feeding the purified gas stream (2) obtained in step a) to an alkaline scrubber (27) and bringing into contact said purified gas stream (2) with an aqueous stream (32) at a pH comprised between 11 and 13 to obtain a liquid stream (29) and the purified gas stream (2');
    g') feeding the liquid stream (29) obtained in step f') to a hydrolysis tank (25) and adding a suitable amount of base (31) to the stream (29) to obtain a liquid effluent (30) and the aqueous stream (32); and
    h') feeding the liquid effluent (30) obtained in step g') to the conditioning tank (9) and recirculating the aqueous stream (32) by feeding it to the alkaline scrubber (27).

6. The method according to claim 1, wherein the method further comprises an additional step i) after step a), wherein said step comprises feeding the purified gas stream (2) obtained in step a) to a fixed-bed aerobic bioreactor (33) to obtain the purified gas stream (2").

7. The method according to claim 4, wherein base (7) of step b) and base (24) of step g) and base (31) of step g') are independently selected from the group consisting of alkaline or alkaline earth metal carbonates, alkaline or alkaline earth metal hydroxides, and alkaline or alkaline earth metal hydrogen carbonates.

8. The method according to claim 1, wherein step c) is carried out at a temperature comprised between 14° C. and 34° C.

9. The method according to claim 1, wherein the method further comprises an additional step j) after step c), wherein said step comprises feeding the biomethane stream (11) obtained in step c) to a dehumidifier (16) to obtain a dry biomethane stream (15).

10. The method according to claim 1, wherein the pH of the liquid effluent (8) is comprised between 7.5 and 8.5.

11. The method according to claim 1, wherein the pH of the output liquid stream (12) exiting the bioreactor is comprised between 7.0 and 7.8.

12. The method according to claim 11, wherein total alkalinity of the liquid effluent (8) of step b) is comprised between 1,000 and 3,000 mg $CaCO_3$/L.

13. The method according to claim 1, wherein the method further comprises an additional step after step c), wherein said step comprises:

k) recirculating from 1 to 95% of the output liquid stream (12) to the liquid effluent (8) before the bioreactor (14); or alternatively, l) recirculating from 1 to 95% of the output liquid stream (12) to the conditioning tank (9).

14. The method according to claim 1, wherein the degasser (20) is an air stripper and step d) comprises bringing into contact said liquid stream (12) with an air stream (17).

15. The method according to claim 5, wherein the base (7) of step b) and base (31) of step g') are independently selected from the group consisting of alkaline or alkaline earth metal carbonates, alkaline or alkaline earth metal hydroxides, and alkaline or alkaline earth metal hydrogen carbonates.

* * * * *